(12) United States Patent
Schurle et al.

(10) Patent No.: US 9,663,926 B2
(45) Date of Patent: May 30, 2017

(54) JET REGULATOR WITH A TUBE RECEPTACLE

(71) Applicant: NEOPERL GMBH, Mullheim (DE)

(72) Inventors: Holger Schurle, Mullheim (DE);
Werner Bammerlin, Mullheim (DE);
Christian Zoschinger, Baindt (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 14/772,767

(22) PCT Filed: Feb. 7, 2014

(86) PCT No.: PCT/EP2014/000344
§ 371 (c)(1),
(2) Date: Sep. 3, 2015

(87) PCT Pub. No.: WO2014/135242
PCT Pub. Date: Sep. 12, 2014

(65) Prior Publication Data
US 2016/0017579 A1    Jan. 21, 2016

(30) Foreign Application Priority Data

Mar. 8, 2013    (DE) .................... 20 2013 002 189 U

(51) Int. Cl.
| | |
|---|---|
| *F16K 21/00* | (2006.01) |
| *E03C 1/04* | (2006.01) |
| *E03C 1/084* | (2006.01) |
| *F16L 37/092* | (2006.01) |

(Continued)

(52) U.S. Cl.
CPC ............. *E03C 1/0404* (2013.01); *E03C 1/04* (2013.01); *E03C 1/0403* (2013.01); *E03C 1/084* (2013.01); *F16L 37/084* (2013.01); *F16L 37/0925* (2013.01); *E03C 2001/026* (2013.01); *E03C 2001/0415* (2013.01)

(58) Field of Classification Search
CPC ....... F16L 37/0925; F16L 37/084; E03C 1/04; E03C 1/0404; E03C 1/0403; E03C 1/084; E03C 2001/026; E03C 2001/0415
See application file for complete search history.

(56) References Cited

U.S. PATENT DOCUMENTS

| | | | | |
|---|---|---|---|---|
| 3,884,513 A | * | 5/1975 | Gassert | ............... F16L 37/0925 285/322 |
| 4,005,883 A | * | 2/1977 | Guest | .................. F16L 37/0925 285/322 |

(Continued)

FOREIGN PATENT DOCUMENTS

| | | |
|---|---|---|
| CA | 2648412 A1 | 6/2010 |
| CN | 2537878 Y | 2/2006 |

(Continued)

*Primary Examiner* — Umashankar Venkatesan
(74) *Attorney, Agent, or Firm* — Volpe and Koenig, P.C.

(57) ABSTRACT

In the case of a sanitary fixture with a jet and/or flow regulator unit, it is proposed forming, on the inlet opening on the inflow side, a tube receptacle to which a connecting tube can be connected with a push fit. A fastening means with which the connecting tube, which is connected with a push fit, can be fastened in, and can be released from, the tube receptacle is arranged on a basic body forming the tube receptacle.

21 Claims, 5 Drawing Sheets

(51) Int. Cl.
*F16L 37/084* (2006.01)
*E03C 1/02* (2006.01)

(56) References Cited

U.S. PATENT DOCUMENTS

| | | | | |
|---|---|---|---|---|
| 4,645,246 | A | * | 2/1987 | Guest .................. F16L 37/0925 285/307 |
| 5,758,690 | A | * | 6/1998 | Humpert ............... E03C 1/0404 137/801 |
| 6,381,774 | B1 | | 5/2002 | Wales |
| 6,684,906 | B2 | * | 2/2004 | Burns .................. E03C 1/0403 137/606 |
| 8,025,318 | B1 | * | 9/2011 | Morroney ........... F16L 37/0925 285/322 |
| 8,185,984 | B2 | * | 5/2012 | Meehan ................ E03C 1/0401 137/801 |
| 8,590,572 | B2 | * | 11/2013 | Nelson .................. E03C 1/0404 137/801 |
| 2008/0185060 | A1 | | 8/2008 | Nelson |
| 2010/0071778 | A1 | * | 3/2010 | Nelson .................. E03C 1/0404 137/15.01 |
| 2010/0170579 | A1 | * | 7/2010 | Wu ....................... E03C 1/0403 137/315.01 |
| 2011/0309616 | A1 | | 12/2011 | Mager et al. |
| 2013/0327853 | A1 | | 12/2013 | Keiter et al. |
| 2014/0215710 | A1 | * | 8/2014 | Christ ...................... E03C 1/04 4/677 |
| 2015/0192214 | A1 | * | 7/2015 | Thomas ................... E03C 1/04 137/625.4 |

FOREIGN PATENT DOCUMENTS

| | | |
|---|---|---|
| CN | 201606605 U | 10/2010 |
| CN | 102725072 A | 10/2012 |
| CN | 102797931 A | 11/2012 |
| DE | 19527232 A1 | 1/1997 |
| EP | 1350573 A1 | 10/2003 |
| EP | 2224065 A1 | 9/2010 |
| EP | 2384819 A1 | 11/2011 |
| EP | 2674534 A1 | 12/2013 |

* cited by examiner

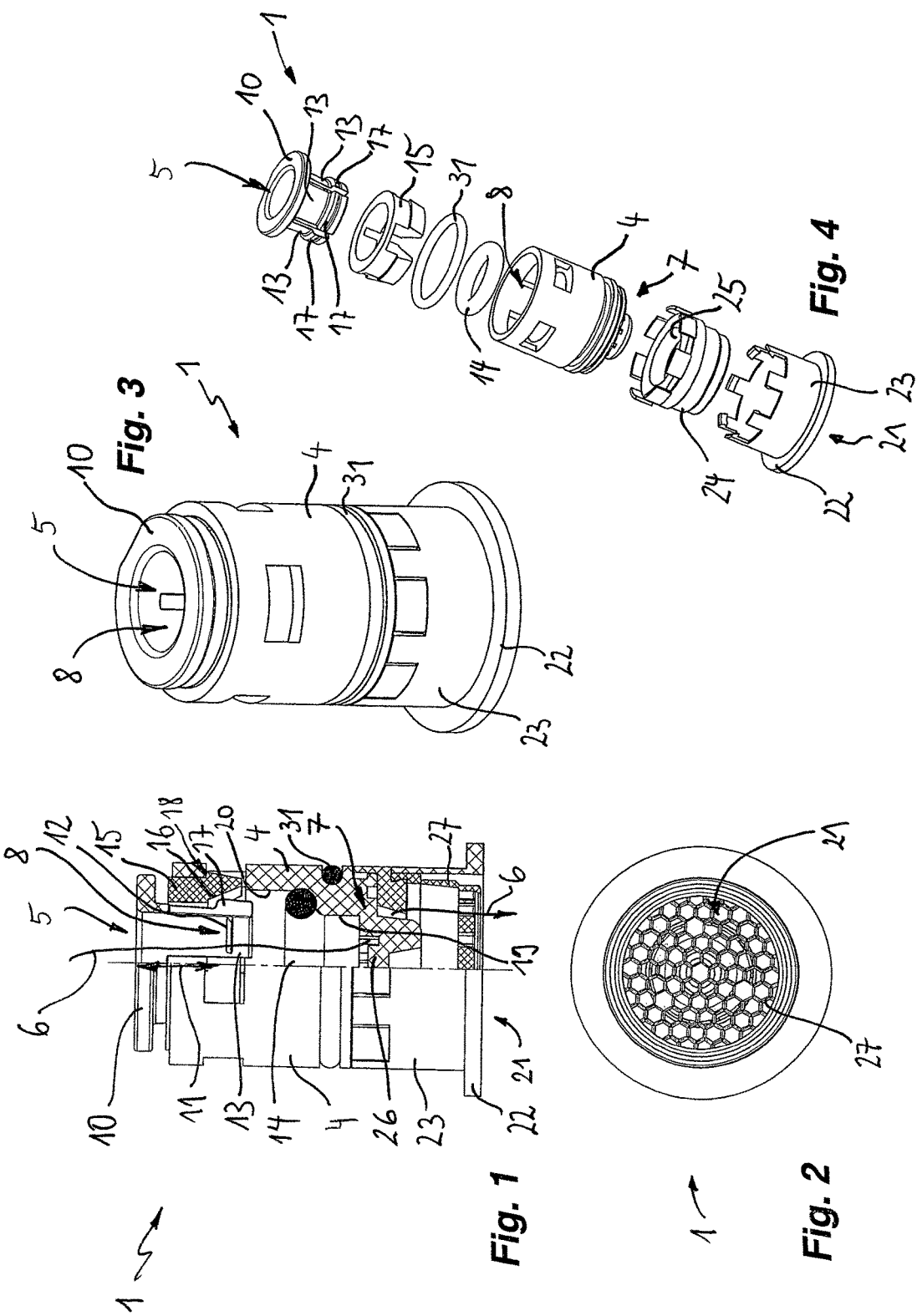

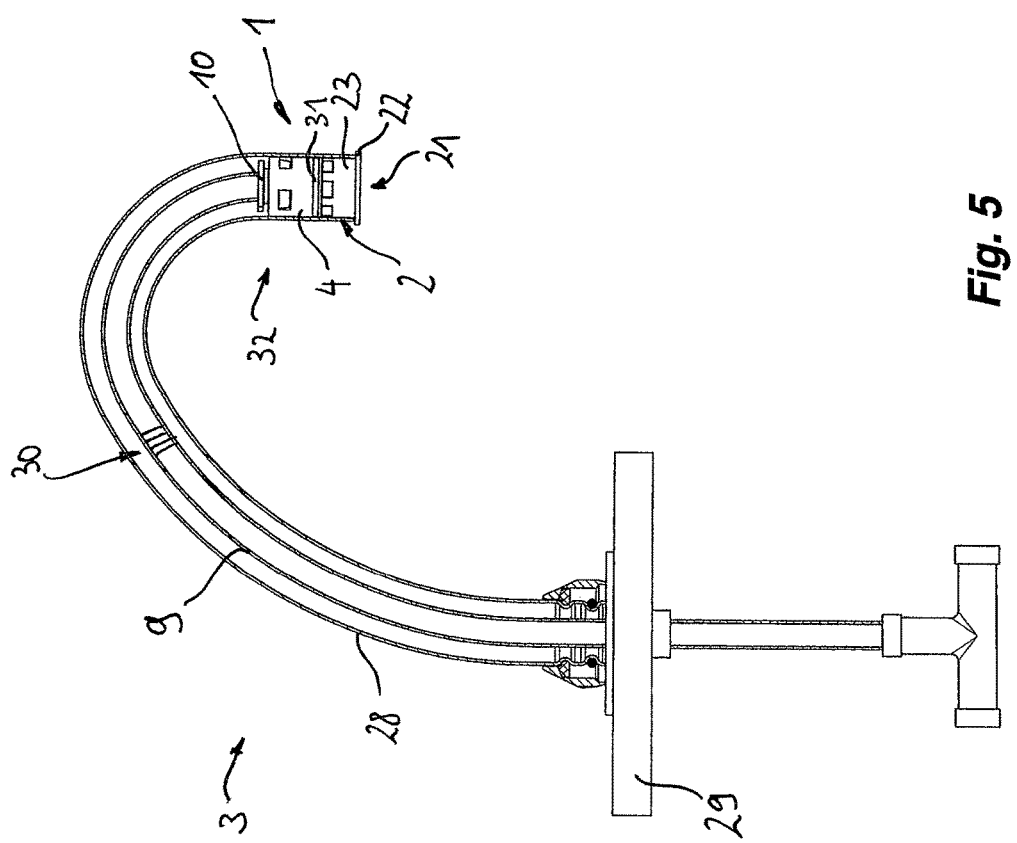

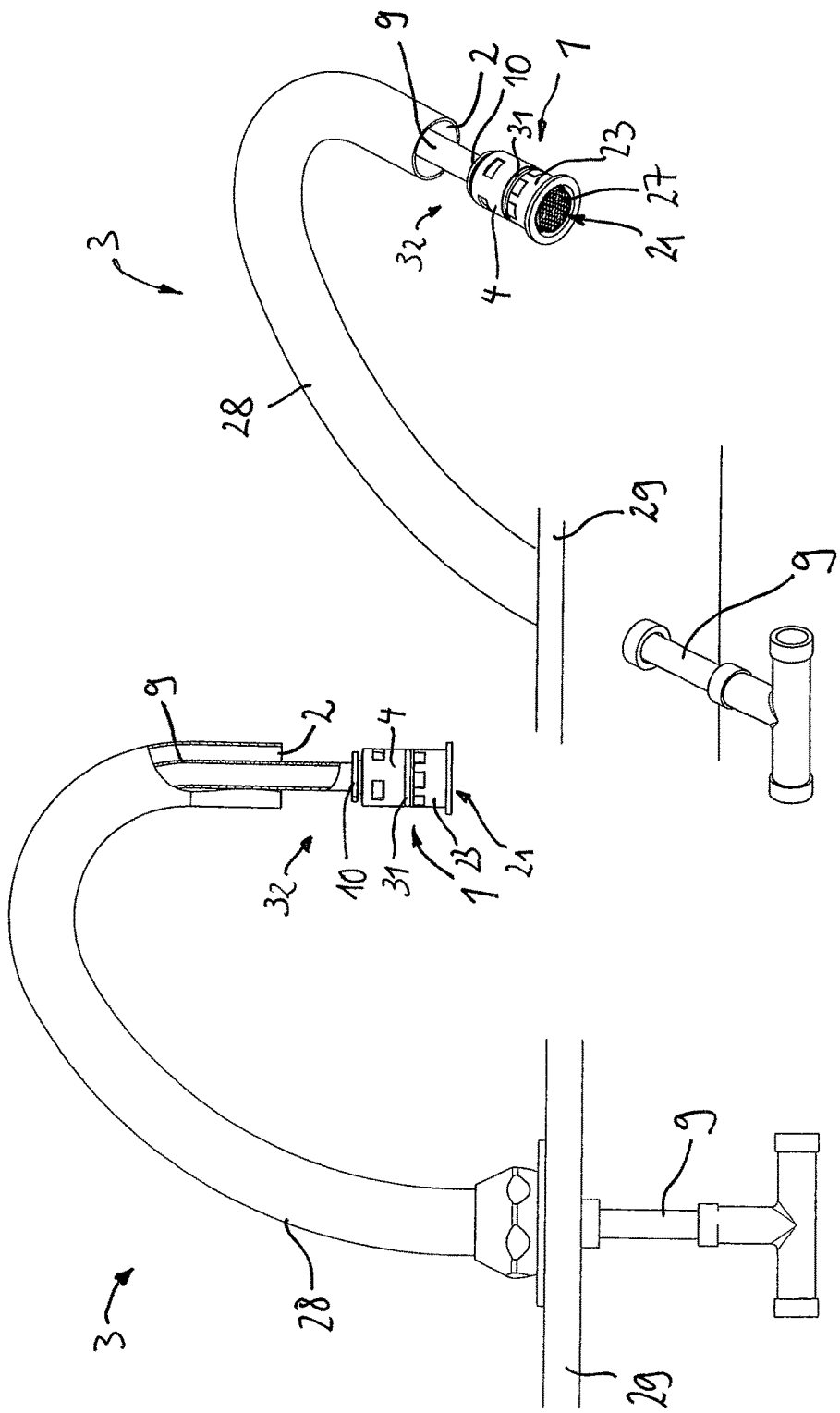

JET REGULATOR WITH A TUBE RECEPTACLE

FIELD OF THE INVENTION

The invention relates to a sanitary fixture having a basic body which is insertable into an outlet opening of a sanitary fitting; having an inlet opening formed on the inflow side of the basic body, on which a tube mount is formed, on which a connecting tube is connectable to the basic body; having a jet regulator unit and/or flow regulator unit arranged on the basic body downstream of the inlet opening in a flow path; and having a fastening means which is configured for tension-resistant fastening of the connecting tube on the basic body and by way of which the connecting tube is non-detachably fastenable to the basic body, wherein the connecting tube is plug-connectable to the tube mount and to this end is capable of being plugged into the tube mount which is configured as a recess, and wherein the connecting tube is lockable or securable in the tube mount by means of the fastening means, such that the connecting tube is non-detachably fastened to the basic body.

Sanitary fixtures of this type are known and are externally provided with a thread, in order for the sanitary fixture to be screwed into the outlet of a fitting as a mouthpiece.

To this end it is necessary for a corresponding internal thread to be cut in the fitting, which is complex in terms of production technology, since the fittings are composed of metal.

The invention furthermore relates to a fixture arrangement having a connecting tube that is fittable in a sanitary fitting.

The invention relates to a sanitary fitting having a fitting body and fixture arrangement of the type described, which is installed in the fitting body.

It has been established as common practice for contact between the potable water flowing in the fitting and the metal wall of the fitting body to be avoided in that an additional internal tube of plastics material is arranged in the fitting body. Here, the basic body already mentioned, which is screwed in, causes a tight press-fit connection to a flange which is configured on the internal tube.

The invention finally relates to a sanitary fitting having a fitting body and a fixture arrangement of the type described, which is inserted into the fitting body.

BACKGROUND

US 2010/0071778 A already discloses a sanitary fixture having a basic body into which an outlet opening of a sanitary outlet fitting is insertable. An inlet opening is formed on the inflow side of the basic body, a jet regulator and/or flow regulator unit being disposed behind said inlet opening in the flow path. A tube mount to which a water-bearing connecting tube is connectable is disposed on the inlet opening of the basic body. A fastening means by way of which a connecting tube which is plug-connectable to the tube mount may be non-detachably fastened to the basic body is formed here on the basic body. However, it is disadvantageous that the basic body of the previously known fixture is configured so as to be multipartite and that the tube mount, on the one hand, and the jet regulator and/or flow regulator unit lying therebehind in the flow direction are disposed so as to be spaced apart from one another in the basic body. Manufacturing and assembling the previously known fixture is complicated on account of the multipartite configuration of the basic body and on account of the fact that, that a leakage-free conduit of water up to the jet regulator and/or flow regulator unit necessitates a tight connection of the component parts in the individual junction planes.

Sanitary fittings having internal tubes have in the past also been used in the context of extendable hand-held shower heads. EP 1 350 573 A1 thus discloses an extendable kitchen shower-head fitting, comprising a central body which is accommodated within an external shroud, the shape of which is configured such that it requires assembly at a specific orientation in relation to the position of the user, on account of which the shower-head fitting is releasably attached to a tubular body of a faucet such that the external shroud has a portion pointing toward the front, facing the user.

EP 2 384 819 A1 discloses a shower-head installation for kitchen sinks, comprising a basic body which is inserted into an external housing, such that said basic body may be gripped by a user, said basic body being provided with a coupling to a flexible water tube which is conceived such that it may be connected to a faucet.

An extendable hand-held shower head is likewise disclosed in U.S. Pat. No. 6,381,774 B1, wherein the hand-held shower head is displaceable between an extended position, in which the shower head is spaced apart from the outlet opening, and a retracted position, in which the shower head is placed beside the outlet opening.

US 2008/0185060 A1 discloses an extendable hand-held shower head in which the handle part is releasably connected to the faucet by way of a magnetic coupling.

EP 2 674 534 A1 discloses a fitting having an extendable shower head which is connected to a shower-head tube and which is configured in such a manner that the tube together with the shower head is reliably guided back into the terminal position after having been pulled out.

CA 2 648 412 A discloses a sanitary fixture which has a basic body which is insertable into an outlet opening of a sanitary fitting. A tube connector is molded onto this basic body, the inflow-side connector opening of said tube connector forming an inlet opening. The tube connector at the same time forms a tube mount on which a connecting tube is connectable to the basic body. The tube connector of the basic body, on the outer connector circumference thereof, has a grip-profile feature which forms a fastening means in order to be able to non-detachably fasten a connecting tube, which is plug-connectable with this tube mount, to the basic body. A sleeve-shaped outlet mouthpiece, into which a jet regulator unit and/or flow regulator unit is insertable, is fastenable to that end side of the basic body that faces away from the tube connector. Since the tube connector is provided at the one end of the basic body, and the outlet mouthpiece is provided at the other end side thereof, and since the mouthpiece which receives the jet regulator unit and/or flow regulator unit therein projects far beyond the basic body, the outlet mouthpiece protrudes correspondingly far beyond the outlet end of the sanitary fitting and is clearly perceivable there as a component which has been separately manufactured from the sanitary fitting.

EP 2 224 065 A1 discloses a sanitary fixture which has a sleeve-shaped basic body. A jet regulator unit and/or flow regulator unit is screwable into this sleeve-shaped basic body from the outflow end side. In contrast thereto, the inflow-side portion of the sleeve-shaped basic body is designed as a fixing sleeve into which a water-bearing connecting tube may be non-detachably plugged in and connected, for example by means of a John Guest coupling. On account of the sleeve-shaped design of the basic body and on account of the requirement for the jet regulator unit and/or flow regulator unit, on the one hand, and the John Guest coupling, on the other hand, to be accommodated therein, the basic body has a comparatively large longitudinal extent which requires a correspondingly long water outlet on the sanitary outlet fitting and which thus may limit the design potentials for such an outlet fitting.

A sanitary fixture of comparable design is also disclosed in DE 10 2007 015 124 A1. The fixture which is described therein has a jet regulator unit to which a connecting tube which is routed through the fitting body is connected. To this end, a tube fitting having a tube connector onto which the tube is pushed, is provided between the tube and the jet regulator. The tube fitting is provided with a sealing face onto which the jet regulator is screwed in a sealing manner. The tube fitting, by way of its stop face which faces away from the sealing face, bears on the free end of the water outlet.

There exists the object of providing a sanitary fixture, a fixture assembly, and a sanitary fitting, by way of which the production effort for a sanitary fitting may be reduced.

SUMMARY

In order for this object to be achieved for the sanitary fixture of the type mentioned at the outset, according to the invention the features of claim 1 are proposed. In a sanitary fixture of the type described at the outset it is particular proposed according to the invention that a tube mount, by way of which a connecting tube is attachable to the basic body, is formed on the inlet opening, and in that a fastening means, by way of which the connecting tube is non-detachably fastenable to the basic body is provided for fastening the connecting tube in a tension-resistant manner to the basic body. The connecting tube here is plug-connectable to the tube mount. To this end, the connecting tube is pluggable into the tube mount which is configured as a recess, wherein the connecting tube is lockable or securable in the tube mount by means of the fastening means, such that the connecting tube is non-detachably fastened to the basic body. It is advantageous here for the jet regulator unit and/or flow regulator unit to be directly fastenable to the connecting tube, without a support or mount by way of a fitting body being required. The connecting tube of the invention is usable as such an internal tube. The invention here exploits the insight that in the case of fittings having an internal tube the water pressure no longer bears on a fitting body but that this water pressure is absorbed by the internal tube. The invention thus exploits that fastening the sanitary fixture to the connecting tube is already sufficient in order for the water pressure to be absorbed. Further fastening means on the fitting body are dispensable. Since the fastening means is configured for fastening the plug-connectable or plug-connected connecting tube to the basic body in a tension-resistant manner, water pressure in the connecting tube is absorbable by the fastened basic body without the connection between the plugged-in connecting tube and the basic body being released.

A captive fastening is understood to be any fastening which by means of the fastening means is secured against uncontrolled self-acting release, in particular in the locked position thereof. The non-detachable fastening may be releasable, in particular reversible, or unreleasable.

Since the tube mount according to the invention is configured as a recess into which the connecting tube is pluggable, suitable sealing means are configurable in the tube mount, and the tube mount may receive a plugged-in tube end of a connecting tube in a pressure tight manner. Latching and/or snap-connecting means which interact with the connecting tube are also configurable on the tube mount.

It is furthermore advantageous that a function of a receiving fitting body can be reduced to what are substantially visual functions, such that the material thickness or the investment in materials in the case of the fitting is reducible. These advantages significantly simplify production of a sanitary fitting. Since the tube mount in the fixture according to the invention is molded onto the jet regulator and/or flow regulator unit, the jet regulator and/or flow regulator unit which is impinged by the water pressure in the connecting tube is particularly well connectable to the connecting tube in order to absorb the water pressure. On account of the tube mount being directly molded onto the jet regulator and/or flow regulator unit, enhanced tightness of the termination of the connecting tube by way of the sanitary fixture is additionally achievable. Since the basic body is configured so as to be monolithic, a basic body which is simple to produce and/or fit is provided.

The jet regulator unit and/or flow regulator unit may be configured and/or arranged so as to be between the inlet opening and an outlet opening which is configured on the outflow side on the basic body or on the sanitary fixture.

The jet regulator unit and/or flow regulator unit is preferably arranged in the basic body.

A jet regulator unit is understood to be a functional unit which has at least one nozzle which is largely responsible for perceivable properties of an exiting water jet. A flow regulator unit is understood to be a functional unit which delimits a throughput rate. Both functional units may also be combined in one jet regulator unit and/or flow regulator unit.

In one advantageous design embodiment it may be provided that the fastening means is designed for fastening a plug-connected connecting tube to the basic body in a releasable manner. It is advantageous here for the basic body to be readily connectable and releasable.

In one advantageous design embodiment it may be provided that the fastening means is arranged on the basic body so as to be rotatable about a connecting direction. It is advantageous here for a rotation movement which is impinged on the basic body, for example during screwing-in, is decouplable from the plugged-in connecting tube. This is because the fastening means which engages the connecting tube does not need to reproduce the rotation movement but may remain immovable. In the design embodiments in which a thread is externally configured, the sanitary fixture is thus capable of being screwed in having the connecting tube plugged in, without the connecting tube being twisted. Even in the case of a design embodiment of the sanitary fixture in which no thread is externally configured, the rotatable arrangement of the fastening means is advantageous in order to avoid damage to the connecting tube in the case of inadvertent inexpert use.

The rotatable fastening of the fastening means on the basic body is furthermore advantageous when the basic body or the sanitary fixture has a non-circular external contour, for example a triangular, rectangular, or polygonal, or irregular external contour. In this case, rotatability enables the sanitary fixture which is fastened to the connecting tube to be inserted into a matching internal contour of a sanitary fitting in the correct or matching orientation.

The tube mount may be configured as a tube connector or a spout, for example, onto which the connecting tube may be attached. The fastening means here may have a tube clamp.

In one advantageous design embodiment it may be provided that the fastening means is formed so as to extend in an annular or sleeve-like manner about a connecting direction defined by the tube mount. To this end, the fastening means, in particular perpendicularly in relation to the longitudinal direction thereof, may have a circular or a square cross section, for example a triangular, or a rectangular, or a polygonal cross section, or a cross section which is of another shape. It is advantageous here for the fastening means to be able to engage an inserted connecting tube by means of a plurality of points which are offset in the circumferential direction and/or all around in the circumferential direction.

In one advantageous design embodiment it may be provided that the fastening means is formed so as to be switchable between a position in which it locks a connecting tube attached to the tube mount and a position in which it releases the connecting tube. It is advantageous here for the captive fastening to be readily establishable and for releasing of the connecting tube for removal from the tube mount to be achievable. The fastening means is preferably configured so as to be self-locking.

In one advantageous design embodiment it may be provided that the fastening means is arranged so as to be movable in a connecting direction defined by the tube mount. It is advantageous here for switching between a locking position and a releasing position to be implementable by displacement in the direction of progression of an inserted tube. On account thereof, the entire installation space which is required may be reduced. Alternatively, switching activation of the fastening means may also be achievable by radial displacement of the fastening means.

Alternatively or additionally, the fastening means may be transported into the releasing position by means of a magnet.

In one design embodiment of the invention it may be provided that the fastening means has at least one retaining element that projects into the tube mount. The retaining element here may be configured as a retaining claw or a retaining edge, or be configured in another manner. It is advantageous here for safe retention of the plugged-in connecting tube to be implementable by way of the retaining element.

It may be altogether provided here that the at least one retaining element is in the form of a barb. It is advantageous here that self-acting retention of the plugged-in connecting tube on the basic body is achievable.

In one design embodiment of the invention it may be provided that the at least one retaining element is formed on an elastically deformable retaining finger. It is advantageous here for operational contact between the retaining element and the plugged-in connecting tube to be readily establishable or cancellable, respectively, by way of elastic deformation of the retaining finger. It is particularly favorable here for the at least one retaining finger to extend in an axial manner. It is advantageous here for an axially extending retaining finger to be movable in the radial direction, such that the retaining element which is configured on the retaining finger, in particular at a tip of the retaining finger, is capable of being readily brought into operational contact with the plugged-in connecting tube.

In one design embodiment of the invention it may be provided that the jet regulator unit and/or flow regulator unit is screwed into the basic body. The remaining part of the basic body here may remain on the connecting tube in order for the jet regulator unit and/or flow regulator unit to be replaced.

The basic body here may be configured or interact with an anti-rotation lock, so as to enable or facilitate screwing-in of the jet regulator unit and/or flow regulator unit.

In one design embodiment of the invention it may be provided that the basic body is designed to be clipped into and/or snap-connected or connected by latching to an outlet opening of a sanitary fitting. It is advantageous here for the basic body to be readily fastenable, so as to receive a jet regulator unit and/or flow regulator unit which is screwable thereinto, for example.

In one design embodiment of the invention it may be provided that a seal that extends in an annular manner around a connecting direction, for example the already mentioned connecting direction defined by the tube mount is formed in the tube mount. It is advantageous here for a connecting tube, after being inserted into the tube mount, to be lockable in a tight manner in relation to the outside.

In one design embodiment of the invention it may be provided that an inside diameter of the seal is coordinated with a clear width of the fastening element. The inside diameter of the seal is preferably smaller than the clear width of the fastening element. It is advantageous here for a connecting tube which fits through the fastening element to be tightly lockable by way of the seal, since the seal automatically bears on the inserted connecting tube in a close manner.

In one design embodiment of the invention it may be provided that a locking ring is formed with an inclined face on the inner side, said inclined face interacting in a locking position, for example the already mentioned locking position, with a lug of the fastening means, said lug protruding radially outwards. It is advantageous here for the lug to be impingeable by way of the internal inclined face when the fastening means is readjusted toward the inclined face. The inclined face ensures that impingement is transformable into a contact force which acts in a radial manner on the inserted connecting tube and which causes captive fastening of the inserted connecting tube. The connection may be readily released by way of relative movement of the fastening means in relation to the locking ring.

In one design embodiment of the invention it may be provided that the locking ring is retained on the basic body by way of a latching connection. It is advantageous here for the locking ring to be readily fittable. It is in particular achievable in this way that the locking ring is insertable into the tube mount after the already mentioned encircling seal has been inserted. It is thus not necessary for the encircling seal to be forced through the comparatively narrow opening of the locking ring in order for the seal to be positioned in the tube mount.

In one design embodiment of the invention it may be provided that a first inner cylindrical portion is formed in the tube mount at an axial end facing the jet regulator unit and/or flow regulator unit. It is advantageous here for centering of an inserted connecting tube to be achievable by way of the first inner cylindrical portion. It is advantageous here for an inserted connecting tube to be readily centerable in the first inner cylindrical portion.

It may be provided here that an inside radius of the first inner cylindrical portion is selected to be larger than an inside radius of the seal. It is advantageous here for connecting tubes in which the seal bears tightly in an automatic manner to be insertable into the tube mount and in particular into the inner cylindrical portion.

In one design embodiment of the invention it may be provided that a second inner cylindrical portion that is mounted upstream of a first inner cylindrical portion, for example the already mentioned first cylindrical portion, in a plug-in direction, for example the already mentioned plug-in direction, is formed in the tube mount. It is advantageous here for a space to be created into which the already described seal is readily insertable.

It may be provided here that a difference between a second inside radius of the second inner cylindrical portion and a first inside radius, for example the already mentioned first inside radius of the first inner cylindrical portion is selected to be smaller than a radial material thickness of the seal. It is advantageous here for a connecting tube which is inserted into the first inner cylindrical portion to radially press the seal against the second inner cylindrical portion, on account of which a particularly well sealing termination is formed.

In one design embodiment of the invention it may be provided that the basic body is designed without a thread on the outside. It is advantageous here for no machining steps for cutting a thread on a fitting body to be required in order for the basic body to be received.

It has been found that the basic body is disposable and fastenable on the fitting only by way of its fastening on the connecting tube.

In one design embodiment of the invention it may be provided that a radially protruding stop element is formed on the outside of the sanitary fixture. It is advantageous here for the stop element to form a resistance against a recoiling force of the water exiting from the outflow opening. During operation of the sanitary fixture in a fitting the basic body is thus automatically retained against the fitting body. The stop element may be configured so as to be annular, for example.

In one design embodiment of the invention it may be provided that the jet regulator unit and/or flow regulator unit has at least one splitter plate. It is particularly favorable here for the jet regulator unit and/or flow regulator unit to have a splitter plate connected integrally to the basic body. It is overall advantageous here for the splitter plate which represents a flow resistance against the water flowing in through the connecting tube to be non-detachably connectable to the connecting tube. Further measures for mounting the jet regulator unit and/or flow regulator unit on the fitting, for example, are thus dispensable.

The connecting tube may be made from PEX (cross-linked polyethylene) or polyamide, for example, so as to provide good flexibility.

In order for the object mentioned at the outset to be achieved, it is provided according to the invention in an installation assembly of the type described at the outset that the sanitary fixture is configured according to the invention, as set forth in the appended claims. It is advantageous here that an assembly which is loosely disposable in a fitting and which absorbs the water pressure in the connecting tube is provided, without additional provisions for fastening the fixture arrangement being necessary on the fixture arrangement and/or on a receiving fitting body. The sanitary fixture here may also be clip-fitted into the fitting body or be fastened in any other manner.

In one design embodiment of the invention it may be provided that the connecting tube has at least one variable-length axial portion. The axial portion may be folded in the manner of a bellows, for example. The advantage here lies in that the sanitary fixture having the connecting tube fastened thereto is readily extractable from a fitting body for dismantling and during fitting is capable of being readily plugged thereinto. The connecting tube thus forms an internal tube of a sanitary fitting which is plug-connected to a sanitary fixture, for example the sanitary fixture according to the invention or any other sanitary fixture.

The configuration of an axial portion which is folded in the manner of a bellows has the added advantage of the connecting tube being bendable using comparatively small radii.

In one design embodiment of the invention it may be provided that markings are applied, preferably at regular intervals, to the connecting tube, said markings indicating a length of the tube mount. It is advantageous here that the user in the case of a tube which has been cut off from goods available by the meter can readily identify how far the connecting tube has to be plugged onto or into the tube mount in order for captive and tight fastening to be achieved. The marking may be configured as a change of color in the connecting tube, by way of printing, embossing or shaping on the connecting tube, or in any other manner.

In order for the mentioned object to be achieved, it is proposed according to the invention in a sanitary fitting of the type described at the outset that the fixture arrangement is designed according to the invention, in particular as claimed in one of claims 15 and 16. It is advantageous here for a readily fittable sanitary fitting to provided, in which direct contact of the potable water conveyed therein with metallic surfaces is avoidable.

In one design embodiment of the invention it may be provided that at least one axial portion of the connecting tube is arranged so as to be movable in its extension direction in the sanitary fitting. It is advantageous here for the sanitary fixture at the end of the tube to be removable from the fitting by moving the connecting tube.

In one design embodiment of the invention it may be provided that the basic body is connected detachably to the sanitary body. It may be provided here that the basic body is retained on the fitting body by way of the connecting tube, that is to say an internal tube of the sanitary fitting, for example. It is advantageous here for force absorption by way of the fitting body of forces resulting from the water pressure to be dispensable. On account thereof, the investment in materials in the fitting body may be reduced without compromising the functionality of the sanitary fitting.

The invention will now be described in more detail by means of exemplary embodiments, said invention not being limited to these exemplary embodiments, however. Further exemplary embodiments are derived by combining the features of individual or a plurality of claims with one another and/or with individual or a plurality of features of the exemplary embodiments.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the figures:

FIG. 1: shows a partly sectional side view of a sanitary fixture according to the invention;

FIG. 2: shows a view onto the outflow opening of the sanitary fixture according to FIG. 1;

FIG. 3: shows a three-dimensional oblique view of the sanitary fixture of FIG. 1;

FIG. 4: shows an exploded view of the sanitary fixture according to FIG. 1;

FIG. 5: shows part of a triple-aperture sanitary fitting according to the invention in a partly sectional illustration;

FIG. 6: shows the sanitary fitting according to FIG. 5, with the sanitary fixture having been pulled out;

FIG. 7: shows a further view of the sanitary fitting as according to the invention per FIG. 6;

DETAILED DESCRIPTION OF THE PREFERRED EMBODIMENTS

Figures 8, 9:
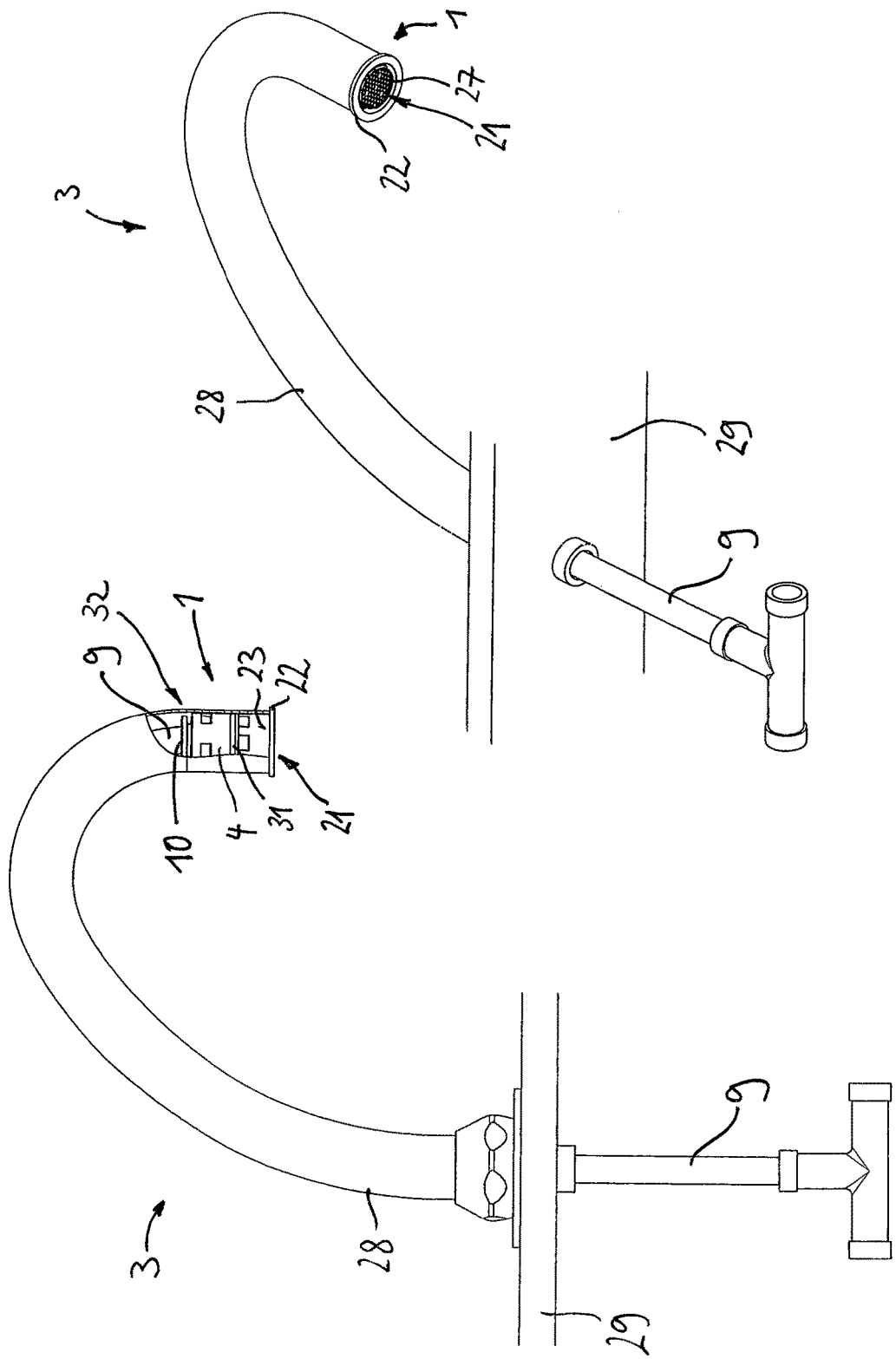
FIG. 8: shows the sanitary fitting according to FIG. 6, with the sanitary fixture having been inserted into the outlet of the sanitary fitting.
FIG. 9: shows a further view of the arrangement according to FIG. 8.

An inlet opening 5 is configured on the inflow side of the basic body 4, that is to say that side which during operation is exposed to the inflowing water.

A jet regulator unit and/or flow regulator unit 7 is configured on the basic body 4, downstream of the inlet opening 5 in the flow direction of a flow path 6.

In the exemplary embodiment according to FIGS. 1 to 4, the jet regulator unit and/or flow regulator unit 7 is illustrated as a jet regulator. Other functions, for example a flow regulator unit, are implemented in further exemplary embodiments.

A tube mount 8 is configured on the inlet opening 5.

The tube mount 8 is adapted so as to receive a connecting tube 9 (cf. FIGS. 5 to 9).

A fastening means 10 is configured on and fitted to the basic body 3.

A connecting tube 9, which is plug-connected to the tube mount 8, is fastenable by way of the fastening means 10.

As will be discussed in more detail hereunder, the fastening means 10 is adapted such that the connecting tube 9, which is plug-connected, is lockable or securable in the tube mount 8, such that the connecting tube 9 is non-detachably fastenable to the basic body 4.

On account of this fastening, the connecting tube 9 is fastenable in a tension-resistant manner, so as to absorb water pressure in the connecting tube 9 by way of the basic body 4.

The fastening means 10 here is configured for releasable fastening, such that the connecting tube 9 is releasable for removal.

It is evident in FIG. 1 that the tube mount 8 is configured as a recess.

The connecting tube 9 in the exemplary embodiment according to FIGS. 1 to 4 is thus capable of being plugged into the tube mount 8.

In further exemplary embodiments the tube mount 8 may also be configured as a tube connector or a spout, the connecting tube 9 being plug-connectable to the tube mount 8.

It is evident in FIGS. 1, 3, and 4 that the fastening means 10 is configured so as to be annular or sleeve-shaped.

The tube mount 8 defines a connecting direction 11 in which the connecting tube 9 is plug-connected and released. The annular or sleeve-shaped fastening means 10 is configured so as to encircle this connecting direction 11.

The fastening means 10 thus radially delimits the tube mount 8 in relation to the outside.

In this description the terms radial, circumferential direction, and axial are used in relation to the longitudinal axis of the sanitary fixture 1.

The fastening means 10 is arranged on the basic body 4 so as to be rotatable about the connecting direction 11. Rotating the basic body 4 about the connecting direction 11 thus does not lead to entrained rotation of a connecting tube 9 which is plug-connected thereto.

In order to be locked or released, respectively, the fastening means 10 is arranged on the basic body 4 so as to be axially displaceable.

On account thereof, the fastening means 10 may be switched between a locking position, in which the connecting tube 9, which is plug-connected, is non-detachably fastened to the basic body 4, and a releasing position, in which the connecting tube 9 is removable from the tube mount 8.

In order for the plugged-in connecting tube 9 to be fastened, the fastening means 10 has a plurality of retaining elements 12, for example four or more than four retaining elements 12, which as a retaining claw or as a retaining edge in each case form a barb and interlock with the inserted connecting tube 9.

FIG. 1 shows the retaining element 12 as a retaining edge.

These retaining elements 12 are in each case configured on the inner side on a retaining finger 13 and project into the tube mount 8.

The retaining fingers 13 extend in an axial manner and are elastically deformable.

The retaining fingers 13 may thus be radially impinged from the outside, so as to impress the retaining elements 12 into a plugged-in connecting tube 9, on account of which this connecting tube 9 is retained in a tension-resistant manner.

However, if in contrast the retaining fingers 13 are radially moved to the outside, the connection between the retaining elements 12 and the plugged-in connecting tube 9 is released, such that the connecting tube 9 is removable from the tube mount 8.

It is evident in FIG. 1 that the jet regulator unit and/or flow regulator unit 7 is integrally formed on the basic body 4 at an axial end of the tube mount 8.

The basic body 4 here is formed integrally from plastics material.

A seal 14 is inserted into the tube mount 8. The seal 14 encircles the connecting direction 11 in an annular manner and thus encompasses a connecting tube 9 which is inserted into the tube mount 8.

To this end, the inside diameter of the seal 14 is coordinated with the clear width of the fastening element 10 in such a manner that a connecting tube 9 which is still just about insertable through the fastening element 10 tightly bears on the seal 14.

A locking ring 15, by way of which the fastening means 10 is lockable, is inserted between the fastening means 10 and the basic body 4.

To this end, the locking ring 15 has an internal inclined face 16, for example an inner cone. The inclined face 16 interacts with an external lug 17 on each retaining finger 13 of the fastening means 10 in such a manner that in the case of relative displacement of the fastening means 10 toward the locking ring 15, the retaining element 12 of each retaining finger 13 is pressed inward into the tube mount, toward the connecting tube 9. This connection may be released again by moving the fastening means 10 in the opposite direction. To this end, protrusions by way of which the retaining fingers 12 are able to be raised from the connecting tube may be configured on the basic body.

The locking ring 15 is fastened in the basic body 4 by way of a latching connection 18.

On account of the bipartite configuration of the basic body 4 and the locking ring 15, the locking ring 15 may be inserted once the seal 14 has been inserted into the tube mount 8.

A first inner cylindrical portion 19 is configured in the tube mount 8 at that axial end that faces the jet regulator unit and/or flow regulator unit 7.

This first inner cylindrical portion 19 has an inside radius which is tuned in such a manner to the external radius of a plug-connectable connecting tube 9 that the connecting tube 9 is plug-connectable into the first inner cylindrical portion 19.

The inside radius of the first inner cylindrical portion 19 is thus selected to be slightly larger than the inside radius of the seal 14. A connecting tube 9 is thus capable of being plugged into the first inner cylindrical portion 19 which supplants the seal 14 in a radial outward manner and presses the latter against a second inner cylindrical portion 20.

This second inner cylindrical portion 20 in the plug-in direction of the tube mount 8 is upstream of the first inner cylindrical portion 19 and of the seal 14.

The second inner cylindrical portion 20 receives the seal 14 and has a second inside radius which is tuned in such a manner to the first inside radius of the first inner cylindrical portion 19 and to the radial material thickness of the seal 14 that the connecting tube 9 not only radially outwardly supplants the seal 14, but that the seal 14 between the plugged-in connecting tube 9 and the second inside radius 20 forms a tight termination in relation to the outside.

To this end, the difference between the second inside radius of the second inner cylindrical portion 20 and the first inside radius of the first inner cylindrical portion 19 is selected to be smaller than the radial material thickness of the seal 14.

It is evident in FIG. 3 that the basic body 4 is externally configured so as to be smooth and, in particular, without a thread.

In order to prevent that, on account of the recoil of the water exiting from the outflow opening 21, the basic body 4 is completely pushed into the outlet opening 2 of the sanitary fitting 3, a stop element 22 which retains the sanitary fixture 1 on the outlet opening 2 is configured on the sanitary fixture 1.

The stop element 22 here is configured on the sanitary fixture 1 so as to radially protrude in an outward manner, and surrounds the sanitary fixture 1 in an annular manner.

The stop element 22 here is configured on a sleeve attachment 23 which is connected to the basic body 4 by way of a latching connection.

The sleeve attachment 23 may also be connected to the basic body 4 so as to be monolithic therewith. The bipartite embodiment shown of the sleeve attachment 23 and the basic body 4 serves for the insertion of an insert 24 which provides an impact face 25 which is annularly encircling and conically tapers in the flow direction of the flow path 6.

This impact face 25 interacts with a splitter plate 26 of the jet regulator unit and/or flow regulator unit 7, so as to nebulize the jet, in a manner which is known per se from a jet regulator.

The splitter plate 26 is configured so as to be monolithic with the basic body 4, so as to absorb the internal water pressure in a connecting tube 9 which is inserted into the tube mount 8.

Finally, a mesh attachment 27 is attached at the rearmost point in the flow path 6.

The mesh attachment 27 defines the outflow opening 21.

FIG. 5 shows the sanitary fixture 1 according to the invention, in a fitted position in a sanitary fitting 3.

The sanitary fitting here is shown in an exemplary manner as a triple-aperture fitting, the associated valves not being illustrated for the sake of simplicity.

It is evident that the fitting body 28 may be configured having a comparatively thin material thickness, since the water pressure is absorbed by way of the connecting tube 9 which is arranged as an internal tube in the fitting body 28.

The sanitary fixture 1 together with the connecting tube 9 forms a fixture arrangement 32 which is fitted to the fitting body 28.

In order for the sanitary fixture 1 to be removed from the outlet opening 2, either the connecting tube 9 below the table 29 may be displaced in an upward manner, or the stop element 22 which slightly protrudes over the fitting body 28, may be gripped.

Alternatively, the stop element 22 may also be configured as a shoulder on an outer cylindrical portion.

FIG. 6 and FIG. 7 show the sanitary fixture 1 in a non-detachably fastened position on the connecting tube 9, once it has been pulled out of the outlet opening 2 of the fitting body 28.

If and when the fastening means 10 is pushed toward the basic body 4, the connection between the retaining elements 12 and the external face of the connecting tube 9 is released.

The sanitary fixture 1 may now be removed and replaced.

A new sanitary fixture 1 may be attached onto the now unoccupied connecting tube 9 and reinserted together with the connecting tube 9 into the outlet opening 2.

The arrangement according to FIG. 8 and FIG. 9 then arises.

Figure 10:
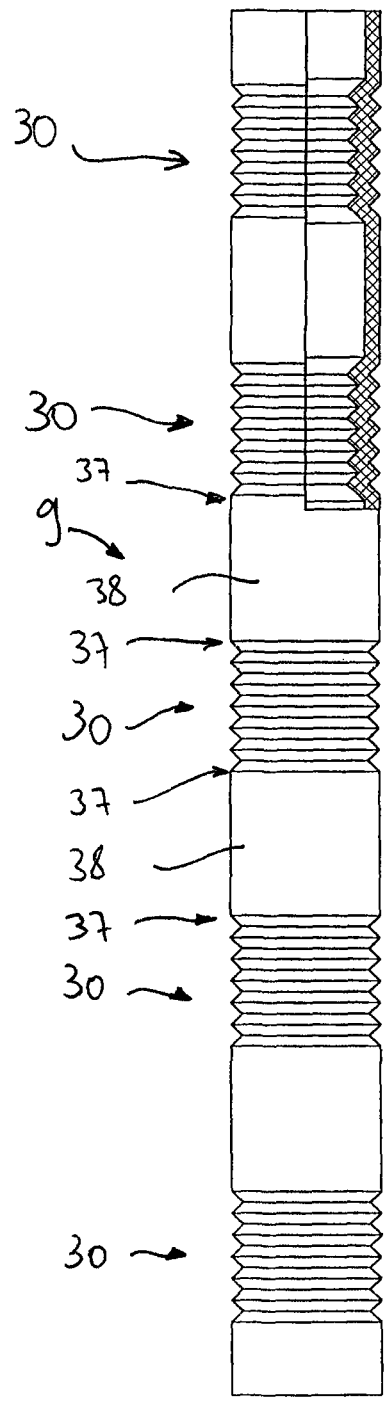
FIG. 10: shows a connecting tube according to the invention with axial portions folded in the manner of a bellows.
Figure 11:
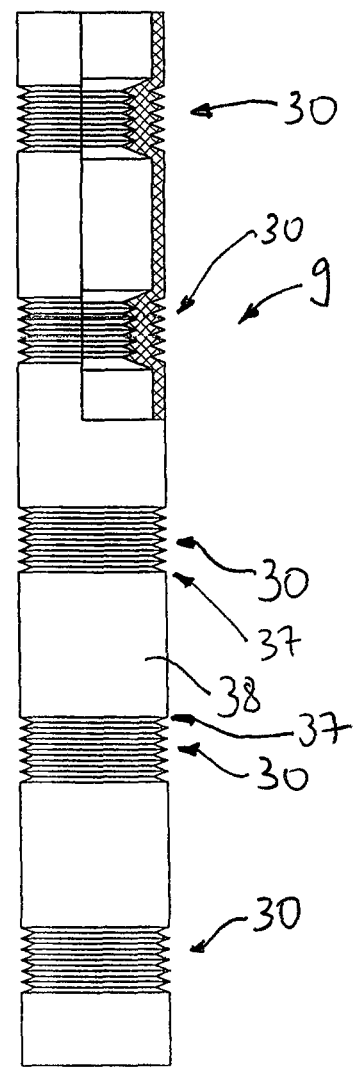
FIG. 11: shows the connecting tube according to the invention with reduced overall length.

FIG. 10 and FIG. 11 show a design embodiment of the connecting tube 9, which may be employed, for example, when the connecting tube 9 cannot be displaced in an upward manner below the table 29.

Regularly spaced axial portions 30 which are length-variable are configured in this connecting tube 9.

FIG. 10 shows the connecting tube having extended axial portions 30; FIG. 11 shows the same connecting tube 9 having compressed axial portions 30.

The axial portions 30 here are folded in the manner of a bellows. As is evident in FIG. 10 and FIG. 11, the axial portions in the cross section have a wall with a zigzag profile.

On account of the regular arrangement of the axial portions 30, that is to say on account of the arrangement of the axial portions 30 at uniform spacing to the respectively adjacent axial portion 30, it is ensured that, independently of the used length of the connecting tube 9, axial portions 30 are available to enable variation of the length for the sanitary fixture 1 to be pulled out of the outlet opening 2.

In this way, the sanitary fixture 1 according to the invention may also be employed in a single-aperture fitting.

The transitions between the axial portions 30 and the smooth tube portions 38 form markings 37. The length of the smooth tube portions 38 is in each case selected so as to be equal to the length of the tube mount 8. In other words, the markings 37 on the connecting tube 9 indicate a length of the tube mount 8.

A user thus may readily identify by way of a connecting tube 9 which has been cut off at a marking 37 how far the connecting tube 9 has to be plugged into the tube mount 8 so that the end of the connecting tube 9 fills the tube mount 8.

In further exemplary embodiments the markings 37 are configured on a connecting tube 9 which has no bellows-type axial portions and is not variable in length.

It is furthermore evident from the drawings according to FIGS. 6 and 7 that no further measures are required at the outlet opening 2 in order for the sanitary fixture 1 to be retained.

The sanitary fixture 1 is thus detachably arranged on the fitting body 28 and is retained on account of the recoil force of the water exiting at the outflow opening 21.

In order for the sanitary fixture to be retained in the outlet opening 2 in a friction-fitting manner, a retaining ring 31 is externally provided on the basic body 4.

Components and functional units which in terms of function and/or construction are identical to the preceding exemplary embodiments or have the same effect as the latter, are identified using the same reference signs and are not separately described again.

In FIGS. 1 to 11, in order for the invention to be described, the sanitary fitting 3 is configured in an exemplary manner as a component part of a vanity fitting. This is a preferred application of the sanitary fixture 1.

In further exemplary embodiments, the sanitary fitting 3 is configured as a shower head, for example to be fitted on a wall, a ceiling and/or a table, or as a hand-held shower head, or as an upwardly directed shower head, in particular of a bidet or of a washbowl, having a sanitary fixture 1 according to the invention.

By way of the sanitary fixture 1 having a jet regulator unit and/or flow regulator unit 7 it is proposed that a tube mount 8, by way of which a connecting tube 9 is plug-connectable, is configured on the inflow side of the inlet opening 5, wherein a fastening means 10 by way of which the connecting tube 9 which is plug-connected is fastenable and releasable in the tube mount 8 is arranged on a basic body 4 which forms the tube mount 8.

LIST OF REFERENCE SIGNS

1 Sanitary fixture
2 Outlet opening
3 Sanitary fitting
4 Basic body
5 Inlet opening
6 Flow path
7 Jet regulator unit and/or flow regulator unit
8 Tube mount
9 Connecting tube
10 Fastening means
11 Connecting direction
12 Retaining element
13 Retaining finger
14 Seal
15 Locking ring
16 Inclined face
17 Lug
18 Latching connection
19 First inner cylindrical portion
20 Second inner cylindrical portion
21 Outflow opening
22 Stop element
23 Sleeve attachment
24 Insert
25 Impact face
26 Splitter plate
27 Mesh attachment
28 Fitting body
29 Table
30 Axial portions
31 Retaining ring
32 Fixture arrangement
33 Receptacle
34 Internal thread
35 Anti-rotation lock
36 Clip element
37 Marking
38 Smooth tube portion

What is claimed is:

1. A sanitary fixture (1) comprising:
   a) a basic body (4) which is insertable into an outlet opening (2) of a sanitary fitting (3);
   b) an inlet opening (5) formed on the inflow side of the basic body (4), on which a tube mount (8) is formed, on which a connecting tube (9) is connectable to the basic body (4);
   c) a jet regulator unit and/or flow regulator unit (7) arranged on the basic body (4) downstream of the inlet opening (5) in a flow path (6); and having
   d) a fastener (10) which is configured for tension-resistant fastening of the connecting tube (9) on the basic body (4) and by way of which the connecting tube (9) is non-detachably fastenable to the basic body (4), wherein the connecting tube (9) is plug-connectable to the tube mount (8) and to this end is capable of being plugged into the tube mount (8) which is configured as a recess, and wherein the connecting tube is lockable or securable in the tube mount (8) by the fastener (10), such that the connecting tube (9) is non-detachably fastened to the basic body (4), the tube mount (8) is integrally formed on the jet regulator unit and/or flow regulator unit (7) and in that the basic body (4) is configured in a monolithic manner.

2. The sanitary fixture (1) as claimed in claim 1, wherein the fastener (10) is designed for fastening a plug-connectable connecting tube (9) to the basic body (4) in a releasable and/or tension-resistant manner.

3. The sanitary fixture (1) as claimed in claim 1, wherein the fastener (10) is arranged on the basic body (4) so as to be rotatable about a connecting direction (11).

4. The sanitary fixture (1) as claimed in claim 1, wherein the fastener (10) is formed so as to extend in an annular or sleeve-like manner about a connecting direction (11) defined by the tube mount (8).

5. The sanitary fixture (1) as claimed in claim 1, wherein the fastener (10) is formed so as to be switchable between a position in which the fastener (10) locks a connecting tube (9) attached to the tube mount (8) and a position in which the fastener (10) releases the connecting tube (9), and/or in that the fastener (10) is arranged so as to be movable in a connecting direction (11) defined by the tube mount (8).

6. The sanitary fixture (1) as claimed in claim 1, wherein the fastener (10) has at least one retaining element (12), that projects into the tube mount (8), and/or in that the at least one retaining element (12) is in the form of a barb.

7. The sanitary fixture (1) as claimed in claim 6, wherein the at least one retaining element (12) is formed on an elastically deformable, preferably axially extending, retaining finger (13).

8. The sanitary fixture (1) as claimed in claim 1, wherein the basic body (4) is formed from plastics material.

9. The sanitary fixture (1) as claimed in claim 1, wherein the jet regulator unit and/or flow regulator unit (7) is screwed into the basic body (4), and/or in that the basic body (4) is designed to be clipped into and/or snap-connected or connected by latching to an outlet opening (2) of a sanitary fitting (3).

10. The sanitary fixture (1) as claimed in claim 1, wherein a seal (14) that extends in an annular manner around the tube mount (8) or a connecting direction (11) defined by the tube mount (8) is formed in the tube mount (8), and an inside diameter of the seal (14) is coordinated with a clear width of the fastening element (10).

11. The sanitary fixture (1) as claimed in claim 1, wherein a locking ring (15) is formed with an inclined face (16) on the inner side, in particular an inner cone, said inclined face (16) interacting in the or a locking position with the or a lug (17) of the fastening means (10), said lug (17) protruding radially outwards, and the locking ring (15) is retained on the basic body (4) by way of a latching connection (18).

12. The sanitary fixture (1) as claimed in claim 1, wherein a first inner cylindrical portion (19) is formed in the tube mount (8) at an axial end facing the jet regulator unit and/or flow regulator unit (7), and/or in that an inside radius of the first inner cylindrical portion (19) is selected to be larger than an inside radius of the seal (14).

13. The sanitary fixture (1) as claimed in claim 1, wherein a second inner cylindrical portion (20) that is mounted upstream of a first inner cylindrical portion (19) or the first inner cylindrical portion (19) in the or a plug-in direction, is formed in the tube mount (8), and/or in that a difference between a second inside radius of the second inner cylindrical portion (20) and the or a first inside radius of the first inner cylindrical portion (19) is selected to be smaller than a radial material thickness of the seal (14).

14. The sanitary fixture (1) as claimed in claim 1, wherein the basic body (4) is designed without a thread on the outside.

15. The sanitary fixture (1) as claimed in claim 1, wherein a radially protruding stop element (22) is formed on the outside of the sanitary fixture (1).

16. The sanitary fixture (1) as claimed in claim 1, wherein the jet regulator unit and/or flow regulator unit (7) has at least one splitter plate (26) connected integrally to the basic body (4).

17. A fixture arrangement (32) having a connecting tube (9) that is fittable in a sanitary fitting (3), and a sanitary fixture (1) as claimed in claim 1.

18. The fixture arrangement (32) as claimed in claim 17, wherein the connecting tube (9) is plug-connected to the sanitary fixture (1), and the connecting tube (9) has at least one variable-length axial portion (30) that is folded in the manner of a bellows.

19. The fixture arrangement (32) as claimed in claim 17, wherein markings (37) are applied, at regular intervals, to the connecting tube (9), said markings indicating a length of the tube mount (8).

20. A sanitary fitting (3) having a fitting body (28) and a fixture arrangement (32), as claimed in claim 17, wherein the fixture arrangement (32) is inserted into the fitting body (28).

21. The sanitary fitting as claimed in claim 20, wherein at least one axial portion (30) of the connecting tube (9) is arranged so as to be movable in an extension direction in the sanitary fitting (3), and/or the basic body (4) is connected detachably to the fitting body (28) and/or is retained on the fitting body (28) by way of the connecting tube (9).

* * * * *